United States Patent

[11] 3,594,511

[72] Inventor David Alexander Pollock
"Woodhurst," Westhall Road,
Warlingham, Surrey, England
[21] Appl. No. 761,626
[22] Filed Sept. 23, 1968
[45] Patented July 20, 1971
[32] Priority Sept. 26, 1967
[33] Great Britain
[31] 43821/67

[54] METHOD OF MANUFACTURING A STRIP-FORM PRINTING PLATE FOR TAPE-FORM RECORDINGS
2 Claims, 6 Drawing Figs.

[52] U.S. Cl. .......... 179/100.2
[51] Int. Cl. .......... G11b 5/84, G11b 5/86
[50] Field of Search .......... 179/100.2 A, 100.2 E, 100.41 L

[56] References Cited
UNITED STATES PATENTS
3,344,238 9/1967 Schwartz .......... 179/100.2
2,559,505 7/1951 Hillier .......... 179/100.2
1,793,403 2/1931 Hutt .......... 179/100.41

OTHER REFERENCES
Knowlton, A. E. STANDARD HANDBOOK FOR ELECTRICAL ENGINEERS, McGraw Hill, New York, N.Y. 1957, pages 2072 to 2074

*Primary Examiner*—Bernard Konick
*Assistant Examiner*—Robert S. Tupper
*Attorney*—Larson, Taylor and Hinds

ABSTRACT: A strip-form printing plate, for printing along a base tape a variable-width recording of information, for example of music, is manufactured by making at a first speed an intermediate recording of the information, for example a disc or photorecording, and reading the intermediate recording at a lower speed to produce signals which are used to control a continuous forming method of producing the required strip-form printing plate at a linear speed that is lower than the linear speeds of making and reading the intermediate recording. If on disc the intermediate recording may be read by means of a novel pickup head described herein. The printing plate may be used to print the variable width recording in magnetic or nonmagnetic ink. If in nonmagnetic ink the printed recording may be read by causing it to modulate the output of a high frequency oscillator in a novel manner described herein.

METHOD OF MANUFACTURING A STRIP-FORM PRINTING PLATE FOR TAPE-FORM RECORDINGS

Figure 1:
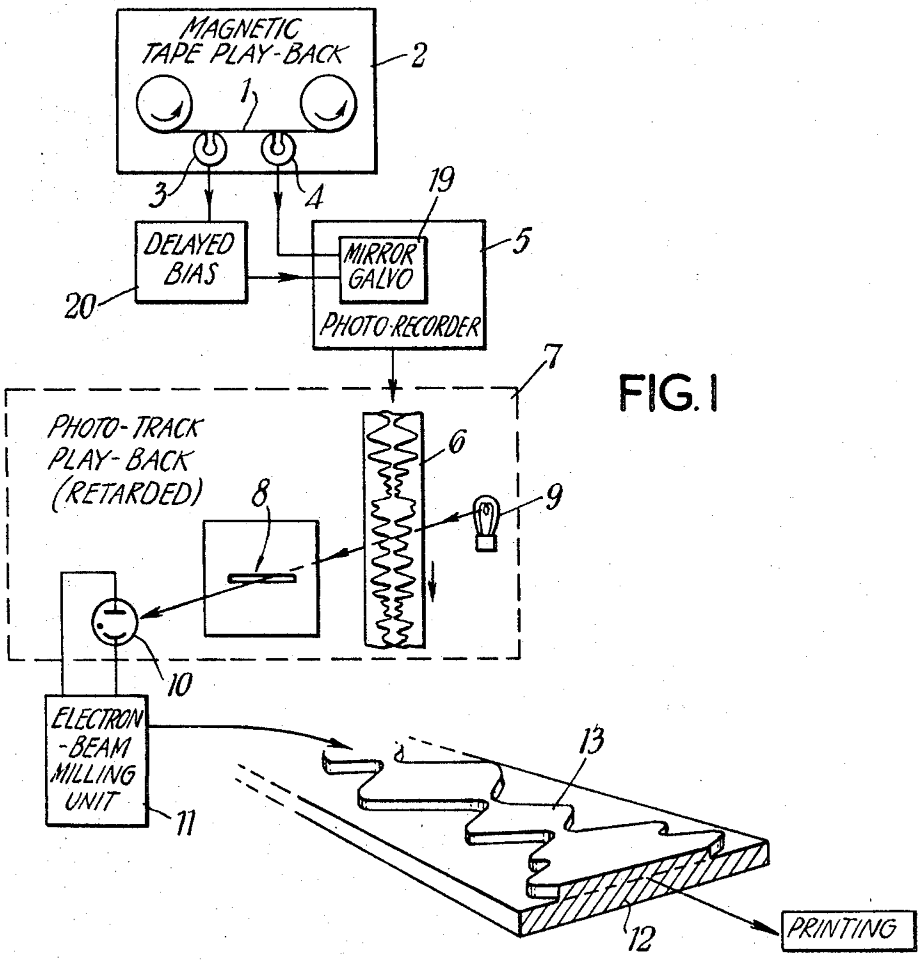

This invention relates to tape-form recordings and the manifolding thereof.

It is possible to produce a tape-form recording of audiofrequency electrical signals by making a variable-width photographic recording from the signals, employing that recording with photoresist techniques to produce a succession of printing plates bearing the information recorded therealong as a variation in width of solid material, and using the printing plates with a magnetic printing ink to print on a base tape a variable-width recording. This tape-form recording can be read, i.e. played back, by normal magnetic-tape sound-reproducing apparatus. The limitations on the fineness of definition obtainable in the photographic recording of higher frequencies, even with the best available film stock, restrict the fidelity of this method of producing a tape-form recording to be played back at a conventional speed of 7½ in./sec. or 3¾ in./sec.

According to a first aspect of the invention there is provided a method of manufacturing a strip-form printing plate, for printing along a base tape a variable-width recording of information made available initially in the form of electrical signals from which an intermediate recording of the information is made, characterized in that the intermediate recording is read, at a speed substantially slower than that at which it was made, so as to supply signals which are employed to control a continuous forming method whereby the required strip-form printing plate is produced progressively, at a linear speed that is slower than the linear speeds of making and reading the intermediate recording, bearing the information recorded therealong as a variation in width of solid material. A tape-form recording, comprising a base tape on which the information is recorded as a variation in width therealong of material printed thereon from a strip-form printing plate manufactured by a method embodying the present invention can be read by means of a playback device comprising an oscillatory circuit having a reactive component adapted to have its reactance varied by travel of the tape-form recording thereby, which circuit provides a modulated output dependent upon the variation of the reactance. The said output may be frequency-modulated or amplitude-modulated.

In an embodiment of the invention, the intermediate recording of the said signals may be made photographically in variable-width form, and the resulting photographic recording be employed to control the production of a master tape, constituting the said strip-form printing plate, which production is carried out at a retarded rate such that the time taken to record the information on the master-tape is considerably longer than the time occupied by the originally available electrical signals. In making the intermediate photographic recording, in such an embodiment of the invention, the film can be run through the recording instrument at a linear speed substantially greater than the final tape playback speed of say 7½ in./sec., so that the intermediate photographic recording is substantially longer physically than the eventual master-tape, thus allowing better definition of higher audio frequencies. The slower-speed reading of the photographic recording to control the production of the master-tape facilitates the use of continuous production techniques such as electron-beam milling.

Figure 6:
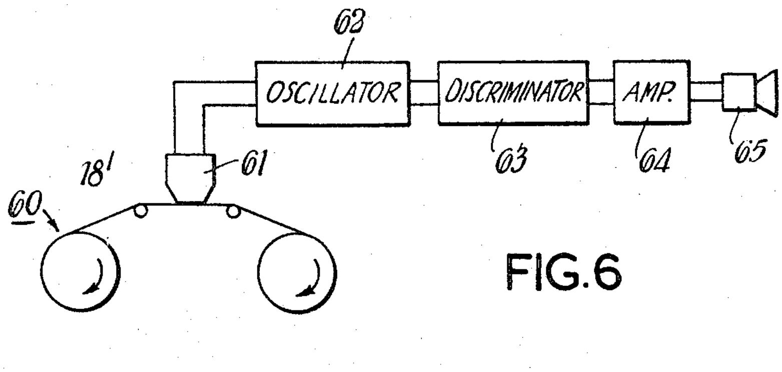
Figure 2:
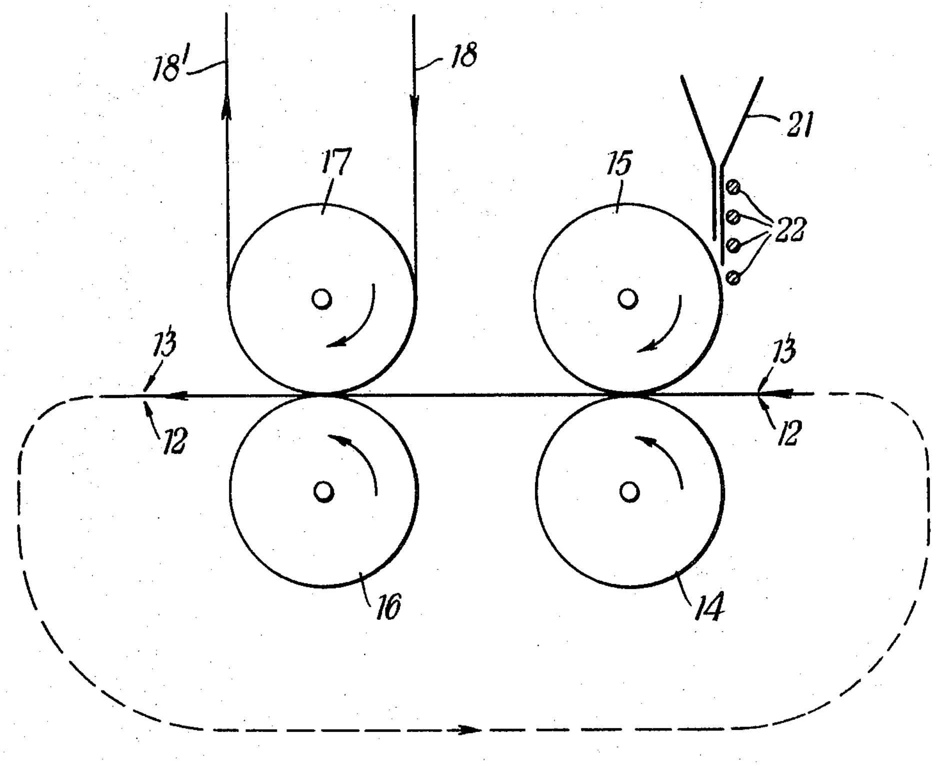
Figures 3, 4, 5:
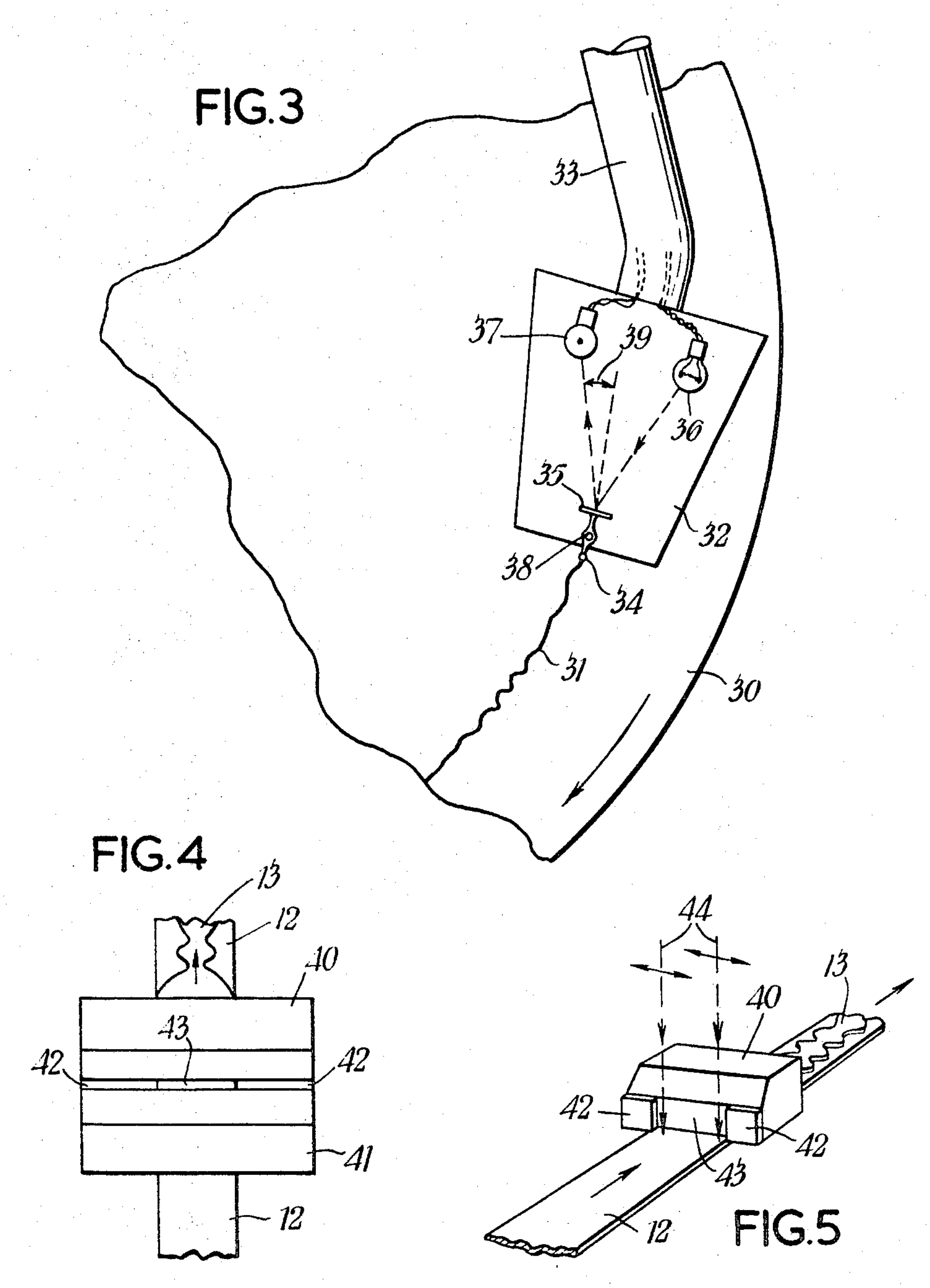

Reference will now be made, by way of example, to the accompanying drawings, in which:

FIG. 1 is a schematic diagram illustrating a method, embodying the invention, of producing a tape-form recording, FIG. 2 is a diagrammatic side elevation illustrating a later stage of the method of FIG. 1, FIG. 3 is a diagrammatic plan view illustrating a modified form of one stage of the method of FIG. 1, FIG. 4 is a plan view illustrating a detail of one aspect of the method of FIG. 1, FIG. 5 is a perspective view of part of the detail shown in FIG. 4, and FIG. 6 is a schematic diagram of a tape playback device in combination with a tape-form recording produced by the method of FIGS. 1 and 2.

The "information," for example a piece of music, of which it is desired to produce tape-form recordings, is first recorded in conventional manner on magnetic tape. This magnetic tape 1 is then read by consecutive playback heads 3 and 4 of a tape deck 2.

The electrical signals made available as outputs from the heads 3 and 4, which signals carry the originally recorded information, are fed to respective amplifiers which provide inputs to a photorecorder 5, which operates in a manner similar to conventional sound recorders used in the film industry and produces a "variable-area" (i.e. variable width) photorecording 6. This intermediate photorecording 6 is fed into a phototrack playback unit 7, where it is made to travel past a transversely orientated slit 8. A light source 9 passes light through the recording 6 and the slit 8 to a gas-filled phototube 10, the electrical output from which controls an electron-beam milling unit 11.

The milling unit 11 cuts away portions of a surface layer on a metal tape 12 to leave thereon a solid upstanding track 13 which constitutes a variable-area recording of the original information.

The optical recording 6 is used repeatedly to produce say a hundred master-tapes of the form 12/13, each of which is connected end to end to form a continuous loop.

The master-tapes are arranged side-by-side and are driven to move horizontally, with their upstanding recordings 13 uppermost as seen in FIG. 2 (where, of course, only one master-tape can be seen). The master-tapes thus arranged are caused to pass between a pressure roller 14 and an opposed inking roller 15 which deposits a printing "ink" on the uppermost surfaces of each track 13. Thereafter the master-tapes pass between pressing rollers 16 and 17, the roller 17 carrying into contact with the inked tracks 13 a wide base-tape 18. The master-tapes 12/13 are thus used as printing plates, a hundred variable-area recordings of the original information being printed simultaneously therefrom, side-by-side, onto the base-tape 18 which, after drying, can be divided into tapes each of which carries only a single printed recording.

The various stages of the above-described method will now be considered in more detail.

Instead of employing magnetic tape 1, the initial recording could alternatively be on disc, when the tape deck 2 would be replaced by a record-player having two pickup heads employing respective styluses running one after the other in the recording groove of the disc.

The photorecorder 5 includes a mirror galvanometer assembly 19 and may operate to produce the optical recording 6, being a bilateral variable-area recording, substantially as described on pages 275 and 276 of the book "Principles of Cinematography" by L. J. Wheeler, 3rd Edition, 1963 (Fountain Press Ltd), with particular reference to FIG. 8.14 on the said page 275. Accordingly, the signals from the first playback head 3 are employed in an amplifier/-rectifier 20 to produce a time-delayed bias which is used for ground noise reduction substantially as described on pages 277 to 280 of the aforesaid book.

Alternatively, the photographic optical recording 6 may be produced in accordance with the principle illustrated in FIG. 8.13 on page 274 of the aforesaid book, but employing two mirror galvanometers arranged to illuminate a film, which may be 35 mm. film of fine grain positive stock, from opposite ends of a slit in front of the film. Normally, when in the rest state, the light from the two mirror galvanometers would illuminate (via the slit) the respective outermost quarter-widths of the film. However, a rest-state direct-current bias is passed through the actuating coils of the galvanometers to bias the mirrors to such a state that the respective illuminations therefrom on the film move inwardly (with respect to the ends of the slit) to an extent such that the respective illuminating beams overlap slightly on the film. In this case the bias supplied by the device 20 (FIG. 1) opposes the rest-state bias, and is such as to just cancel the rest-state bias when the input to the device 20 correspond only to the inherent background noise of the original magnetic-tape recording (1). As the tape 1 is played back in the unit 2 the device 20 amplifies the signals read from the tape by the head 3, rectifies them, and produces therefrom a DC bias which is proportional to the amplitude of the signals read by the head 3. The resulting DC bias is fed to the mirror galvanometer assembly 19 with a time delay substantially equal to the time taken for a point of the tape 1 to travel from the head 3 to the head 4. The output signals from the head 4 are superimposed at the galvanometer assembly 19 on the bias from the device 20 so as to operate the two mirrors in antiphase and so produce a bilateral variable-area photorecording 6. The automatically varied delayed-bias arrangement ensures that the photorecorded track has the minimum width at any given instant, compatible with undistorted recording of the full sweep of the light beams from the galvanometer mirrors.

The light source employed in the photorecorder 5 may comprise a fluorescent strip lamp energized by direct current, and should desirably have high violet and ultraviolet content, with the red end of the spectrum suppressed to avoid halation due to unwanted spread of the longer wave-length light.

Not being limited by the speed requirements associated with the provision of a sound-track on a cinematograph film, the photorecorder 5 is made to produce the recording 6 on film running at a speed substantially higher than would be employed in such conventional sound-track recording methods. For example, the recording film may advantageously be run at a speed of 30 inches per second.

A photographic print of the photorecording obtained from the unit 5 comprises a dark central track which represents the recorded information and is bounded by clear edges, as shown at 6.

This intermediate photorecording can be read, or "played-back," in the unit 7 as slowly as may be required for optimum operation of the electron-beam milling unit 11 in the production of the master-tape 12/13. If the photorecording 6 is produced in the photorecorder 5 at a speed of 30 inches per second, and if the tape-form recordings eventually printed from the master-tape 12/13 are intended to be played back at a linear speed of 3¾ inches per second, then the linear speed at which the photorecording 6 is made to travel past the slot 8 in the unit 7 should be eight times as great as the speed (whatever it may be) at which the finished master tape is to be produced in the unit 11. It will be appreciated, of course, that retarded playback of the magnetic tape 1 itself to control the milling unit 11 directly, would give output signals too weak for satisfactory control of the unit 11.

The intermediate recording may be made, instead of on photographic film by the photorecorder 5, on disc, in substantially conventional manner. FIG. 3 shows part of such a disc 30 on which the intermediate recording is borne as an impressed spiral track, part of one turn only of which is shown at 31. To produce the control signals for the unit 11 of FIG. 1, the disc-form recording 31 is "read" by means of a special pickup head 32 carried by a tracking arm 33. The pickup head carries a low-inertia stylus member having at one end a stylus 34, which travels in the track 31, and at an opposite end a mirror 35 for reflecting light from a lamp 36 to a photocell or other photoelectric device 37. Between its two ends the stylus member is pivoted at a location 38 which, like the lamp 36 and device 37, is fixed in the pickup head 32. The lamp 36 has a strip-form filament arranged perpendicularly to the pivotal axis of the stylus member carrying the mirror 35 but parallel to the surface of the mirror when in its undisturbed mean position.

The record track 31 is cut initially at say 78 r.p.m.. When reading this recording, the disc 30 is rotated at the selected lower speed appropriate for operation of the milling unit 11, say at one-tenth of the recording speed, with the stylus 34 resting in the track 31. Because of the relatively high inertia of the head 32, the stylus 34 in the track 31 is moved from side to side, in relation to the head 32, by the modulated sides of the track 31. This movement causes the center of the light reflected from the mirror 35 to oscillate within a small arc 39. The arrangement is carefully designed so that this oscillation produces a closely proportional variation in the illumination of the device 37, which consequently develops the required electrical control signals. These signals are then amplified and fed to the unit 11. The control signals, like the power for the lamp 36, are fed via leads carried within the tracking arm 33.

The proposed use of an electron-beam milling unit at 11 is merely a suggestion from one of a number of alternative ways in which the photorecording 6 (or disc transcription 31) may be used to control the production of a master-tape 12/13. For example, the master-tape may be formed with the track 13 by means of two extremely fine laser beams which are caused to oscillate respectively from the two edges of the base tape 12, under the control of signals received from the phototube 10, so as to cut into the material of the base tape 12 and leave the upstanding record track 13.

If the milling beams, whether electron beams or laser beams, are made to oscillate across the tape 12 at a frequency in the range from 10 kHz. to 12 kHz., when producing a recording finally to be played back at 3¾ in. per sec., the tape surface will be subjected to about two milling sweeps, across a milling gap of 2 microns width, when the record/read speed reduction ratio of for example a disc-form intermediate recording is 10:1. Limitation of the beams to a milling gap of say $2\mu$ is achieved, as shown in FIG. 4, by clamping together two blocks 40 and 41, made of mica or other heat-resisting substance, having between them two shims 42, of $2\mu$ thickness each, to leave a milling gap 43 in the form of a slot $2\mu$ wide and either ¼ inch long (for full track recording) or ⅛ inch long (for half-track recording). The blocks 40 and 41 are chamfered or tapered towards the gap 43. In FIG. 5 the block 41 has been removed for clarity, and milling beams 44 are shown directed via the gap 43 onto the tape 12. If desired, unwanted particles of material detached by the milling beams may be removed by a suction nozzle in proximity to the cutting area or by an electrode with a high static charge. It may also be desirable to cool the gap area with a blast of cold air.

Instead of such milling beams, it might be possible to employ the phototube 10 to control a cathode-sputtering process for removing material from the base tape 12 as required.

The phototube 10 may be replace in other embodiments by such alternative light-sensitive devices as photo transistors or photoresistors. The output signals developed by such devices are amplified before being used to control the forming of the master-strip.

Instead of repeating the slowed-down master tape forming process to produce additional printing copies the master tape, or strips thereof, may be used to impress the sort of wax employed in the manufacture of gramophone records, thereby to make moulds with which printing tapes, being copies of the master tape, can be made. The production of such moulds may be carried out continuously, by leading the master tape, from a roll, in parallel with a tape bearing moulding wax, and pressing the two tapes together between a pair of rollers. Indeed, after being pressed against one moulding tape in this manner the master tape may be led to a second pair of rollers and there pressed against a second moulding tape, being moved along with the master tape between the second rollers, and so on. In this way a number of moulds can be produced continuously in one run of the master tape, at respective locations arranged successively along the path of the master tape.

The master-tape or printing tape material need not necessarily be metallic, but is desirably of such molecular structure as to be capable of a high degree of resolution, for the reproduction of the higher audiofrequencies, for example, when used at low linear speed. It is desirable also that the material should be capable of withstanding the wear in the process of making large numbers of prings therefrom. It seems likely that copper may be a suitable material for the master-tape. However, the track 13 need not necessarily consist of a simple solid metal, but may alternatively be made from a colloidal metal solution sprayed onto a suitable supporting base 12; the upstanding track 13 will then comprise a substantially solid structure made up of the original colloidally provided metal which is left on the central region of the base tape 12.

Considering FIG. 2 now in more detail, the ink supplied to the upstanding track 13 by the roller 15 may comprise a ferri-oxide/lacquer mixture such as is conventionally used in the production of normal magnetic tapes. This "ink" is fed to the roller 15 from a hopper 21.

In passing downwardly from the hopper 21 to the roller 15 the ink travels past a succession of horizontal steel wires indicated diagrammatically at 22. The wires 22 are in, and directed parallel to, a strong magnetic field the strength of which decreases from wire to wire in the downward direction. The effect of this magnetic arrangement is to align the acicular ferri-oxide particles substantially parallel with the axis of the roller 15, to that the main axes of those particles when deposited on the upstanding tracks 13 of the master-tapes are arranged substantially perpendicularly to the longitudinal axes of those tapes. This alignment of the magnetic "ink" particles may alternatively be produced by a simple magnetic field provided by helical coil or permanent magnet means.

The thickness of the "ink" to be deposited upon the strip 18 in the printing process may be a few microns, say 3 to 5 microns, a determining factor being the extent of wear when the recordings printed on the strip 18' are replayed.

After the "ink" has dried on the printed tape 18', the printed recordings are sensitized by subjecting them to a unidirectional magnetic field which is directed parallel to the surface of the tape, but perpendicular to its longitudinal axis, and is of sufficient strength to bring about magnetic saturation of the dried "ink." The finished magnetic tapes cut from the broad printed tape 18' may be played back by conventional magnetic-tape reproducing apparatus.

Alternatively, the "ink" used in the printing process may be nonmagnetic containing minute particles of nonmagnetic metal or dielectric material. In this case a printed tape may be played-back as follows (see FIG. 6). A conventional tape-transport mechanism 60 passes the tape 18' at the required constant speed across a playback head. This head comprises a metallic loop, or inductive helix, the ends of which bound a fine gap of say 2 to 3 microns across, having a width slightly greater than that of the tape being played. The inductance of the loop or helix is part of the tank circuit of a U.H.F. oscillator 62. The passage of the variable-area printed recording across the aforesaid gap will therefore frequency-modulate the output of the oscillator, which output may be fed to a discriminator 63 and subsequent amplifying circuits feeding a speaker. It may be possible to feed the output from the oscillator 62 simply to the aerial input of a conventional F.M. radio receiver (not shown). Alternatively, the playback head 61 may be in the form of a small capacitor, the edges of its plates forming the scanning gap, and the capacitor forming part of the tank circuit of the oscillator (this would probably be more suitable for playing back recordings printed in dielectric "ink").

It will be appreciated that such recordings, when printed in magnetic "ink" can provide a higher level of modulation than is practicable by presently employed variable density methods of magnetic tape-recording, partly because "print-through" difficulties will not arise with magnetic recordings made by applications of the present invention. This advantage may also permit thinner base tapes to be employed, provided that sufficient tensile strength can be maintained.

It is conceivable that the present invention may find applications in recording fields other than that of audiofrequency recording, for example in the video-recording field.

It is conceivable also that electrical signals providing the controlling input to the mirror galvanometer assembly 19 of FIG. 1 may be provided directly from a microphone actuated by sound waves which are to be recorded.

I claim:

1. A method of manufacturing a strip-form printing plate for printing a variable-width recording of information along a base tape comprising the steps of:

a. producing an intermediate recording of the information from electrical signals representing the original information;

b. reading the intermediate recording at a speed substantially slower than that at which the intermediate recording was made to produce corresponding control signals;

c. utilizing said control signals to control a continuous forming process so as to progressively produce, at a linear speed that is slower than the speeds of producing and reading the intermediate recording, a strip-form printing plate bearing the information recorded therealong as a variation in the width of the solid material making up the plate.

2. A method of manufacturing a strip-form printing plate as claimed in claim 1 wherein said continuous forming process comprises electron-beam forming.